United States Patent [19]
Endo et al.

[11] Patent Number: 6,013,994
[45] Date of Patent: Jan. 11, 2000

[54] CONTROLLER OF ELECTRIC POWER-STEERING SYSTEM

[75] Inventors: Shuji Endo; Hideyuki Kobayashi; Kei Chin; Yusuke Itakura; Hideaki Kawada, all of Maebashi, Japan

[73] Assignee: NSK Ltd., Tokyo, Japan

[21] Appl. No.: 08/931,619

[22] Filed: Sep. 16, 1997

[30] Foreign Application Priority Data

| Oct. 1, 1996 | [JP] | Japan | ................................... 8-260542 |
| Oct. 7, 1996 | [JP] | Japan | ................................... 8-282874 |
| Jun. 9, 1997 | [JP] | Japan | ................................... 9-151075 |

[51] Int. Cl.⁷ ............................. H02P 7/14; B62D 5/04
[52] U.S. Cl. ...................... 318/432; 318/430; 318/488; 318/434; 364/424.05; 180/79.1
[58] Field of Search ........................ 318/430–464, 318/138, 139, 466, 290–294, 283, 599; 388/811; 180/79.1; 364/424.05

[56] References Cited

U.S. PATENT DOCUMENTS

| 4,992,944 | 2/1991 | Noto et al. ........................... 364/424.05 |
| 5,040,629 | 8/1991 | Matsuoka et al. ....................... 180/79.1 |
| 5,076,381 | 12/1991 | Daido et al. .............................. 180/79.1 |
| 5,150,021 | 9/1992 | Kamono et al. .......................... 318/488 |
| 5,303,156 | 4/1994 | Matsuoka et al. .................. 364/424.05 |
| 5,485,067 | 1/1996 | Nishimoto et al. ....................... 318/466 |
| 5,507,359 | 4/1996 | Wada ....................................... 180/79.1 |
| 5,675,699 | 10/1997 | Yamamoto et al. ...................... 388/811 |

*Primary Examiner*—Paul Ip
*Attorney, Agent, or Firm*—Sughrue, Mion, Zinn, Macpeak & Seas, PLLC

[57] ABSTRACT

To provide a controller of an electric power-steering system, capable of improving the steering performance by presuming a motor angular speed ω in a range in which the angular speed of a motor is small and moreover very accurately presuming the motor angular speed and thereby, completely showing the functions for compensating the inertia of the motor and controlling the astringency of a vehicle. Because the presumed error of a back electromotive force between a model motor and a motor to be actually mounted is proportional to a motor current, a dead zone of a motor angular speed having a width proportional to a motor current is set to the presumed value of the motor angular speed. When the motor current is small, the width of the dead zone also decreases. Therefore, it is possible to presume an angular speed ω even in a region where the motor angular speed is small. Moreover, a motor angular speed is presumed by defining impedance models of motor driving systems in an intermittent mode and a continuous mode.

14 Claims, 16 Drawing Sheets

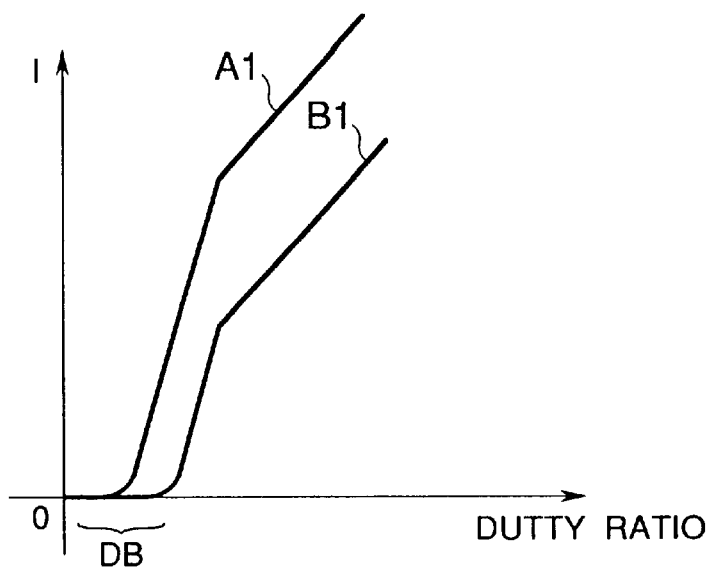
FIG.7
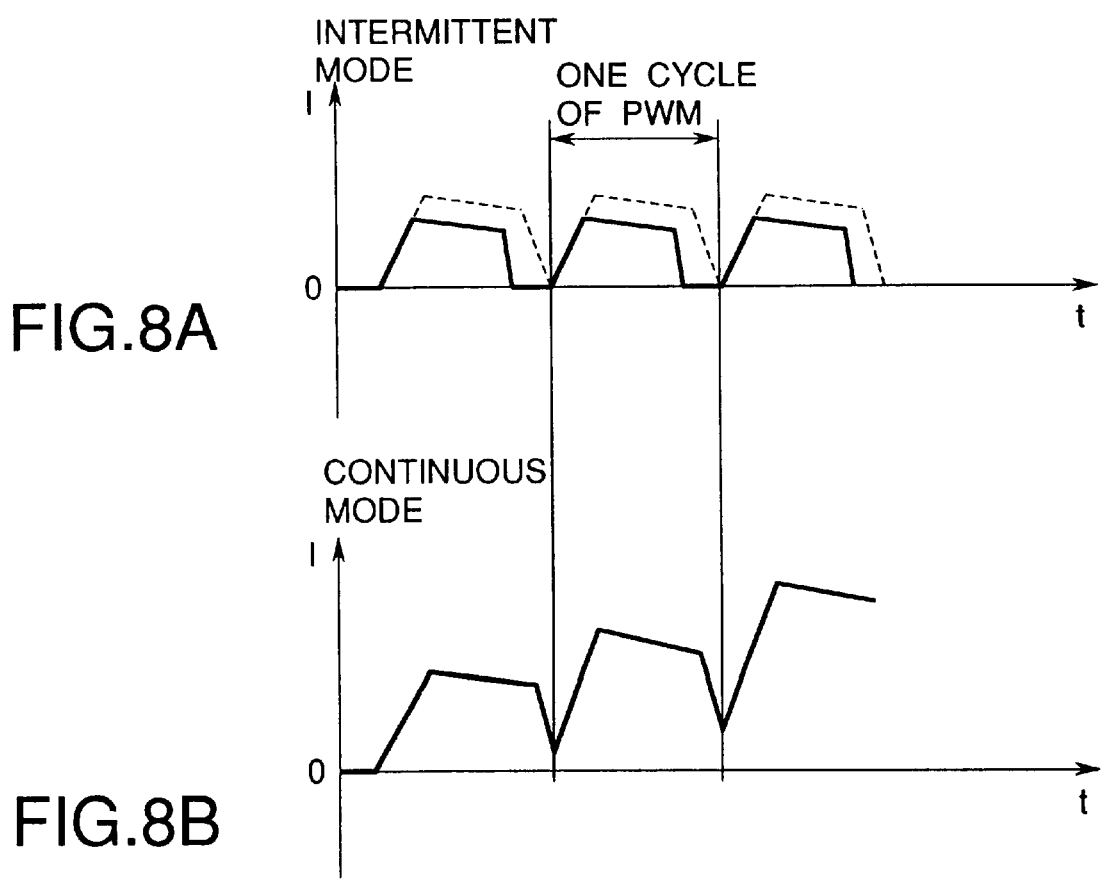
FIG.8A
FIG.8B

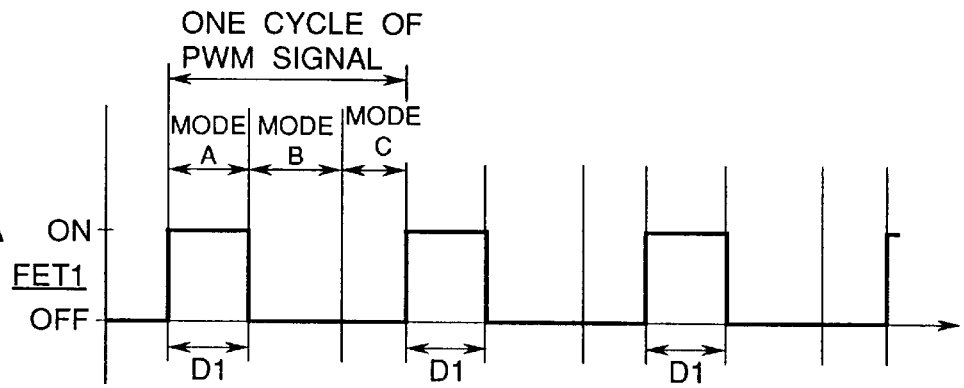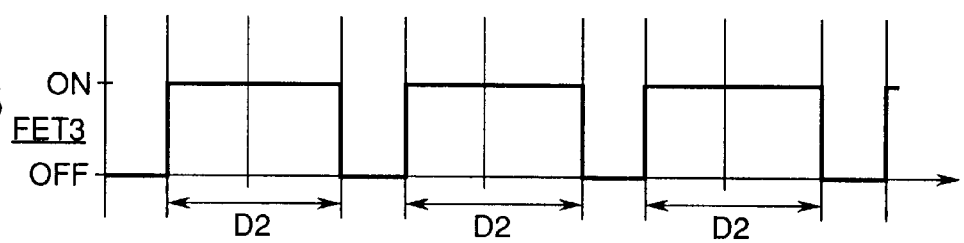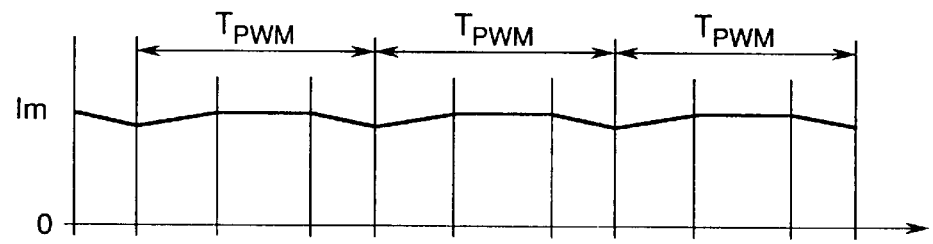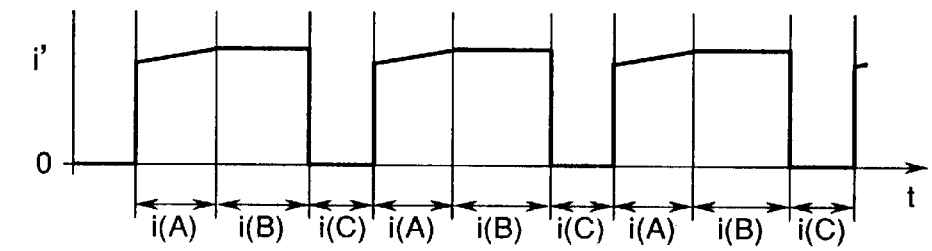

CONTROLLER OF ELECTRIC POWER-STEERING SYSTEM

BACKGROUND OF THE INVENTION

1. Field of the Invention

The present invention relates to a controller of an electric power-steering system constituted so as to supply a steering assist force produced by an electric motor to the steering system of an automobile or vehicle, particularly to a controller of an electric power-steering system making it possible to improve such steering performances as the overall control accuracy and follow-up characteristic by very accurately estimating a motor angular speed without being influenced by temperature or the like. Moreover, the present invention relates to a controller of an electric power-steering system for economically detecting a motor current value when using an H-bridge circuit of semiconductor elements for a motor driving circuit.

2. Description of the Prior Art

An electric power-steering system for a vehicle detects a steering torque and a vehicle speed generated at a steering shaft by operating a steering wheel, computing a steering assist command value in accordance with the detection signal, and assisting the steering force of the steering wheel by driving a motor in accordance with the computed steering assist command value. An electronic control circuit including a microcomputer (or microprocessor) is used to compute the steering assist command value and control the motor in accordance with the command. The above conventional electric power-steering system performs the feedback control of a motor current in order to accurately generate an assist torque (steering assist torque). The feedback control adjusts a motor applied voltage so that the difference between a current control value and a detected motor-current value decreases and the motor applied voltage is adjusted by adjusting the duty ratio of PWM (Pulse Width Modulation) control in general.

In this case, a general structure of the electric power-steering system is explained below by referring to FIG. 1. A shaft 2 of a steering wheel 1 is connected to a tie rod 6 of traveling wheels through reduction gears 3, a universal joints 4a and 4b, and a pinion/rack mechanism 5. The shaft 2 is provided with a torque sensor 10 for detecting the steering torque of the steering wheel 1 and a motor 20 for assisting the steering force of the steering wheel 1 is connected to the shaft 2 through a clutch 21 and the reduction gears 3. Electric power is supplied to a control unit 30 for controlling the power steering system from a battery 14 through an ignition key 11. The control unit 30 computes a steering assist command value I of an assist command in accordance with a steering torque T detected by the torque sensor 10 and a vehicle speed V detected by a vehicle speed sensor 12 and controls the current to be supplied to the motor 20 in accordance with the computed steering assist command value I. The clutch 21 is turned on/off by the control unit 30 and it is turned on (connected) under the normal operating state. Moreover, the clutch 21 is turned off (disconnected) when the control unit 30 judges that the power steering system is broken down and the power supply (voltage Vb) of the battery 14 is turned off by the ignition key 11.

The control unit 30 mainly comprises a CPU. FIG. 2 shows general functions to be executed by a program in the CPU. For example, a phase compensator 31 does not show a phase compensator serving as independent hardware but it shows a phase compensating function to be executed by the CPU. Functions and operations of the control unit 30 are described below.

The steering torque T detected and inputted by the torque sensor 10 is phase-compensated by the phase compensator 31 in order to improve the stability of the steering system and a phase-compensated steering torque TA is inputted to a steering assist command value computing unit 32. Moreover, the vehicle speed V detected by the vehicle speed sensor 12 is also inputted to the steering assist command value computing unit 32. The steering assist command value computing unit 32 determines the steering assist command value I which is a control target value of a current to be supplied to the motor 20 in accordance with the inputted steering torque TA and the inputted vehicle speed V, which is provided with a memory 33. The memory 33 stores the steering assist command value I corresponding to the steering torque by using the vehicle speed V as a parameter and the steering command value computing unit 32 computes the steering assist command value I. The steering assist command value I is inputted to a subtractor 30A and also inputted to a differential compensator 34 of a feedforward system for rising a response speed, a deviation (I-i) of the subtractor 30A is inputted to a proportional computing unit 35, and the proportional output of the proportional computing unit 35 is inputted to an adder 30B and also inputted to an integral computing unit 36 for improving the characteristic of a feedback system. Outputs of the differential compensator 34 and the integral computing unit 36 are also additionally inputted to the adder 30B and a current control value E which is a result of addition by the adder 30B is inputted to a motor driving circuit 37 as a motor driving signal. A motor current value "i" of a motor 20 is detected by a motor current detecting circuit 38, inputted to the subtractor 30A, and feedbacked.

A structure of the motor driving circuit 37 is described below by referring to FIG. 3. The motor driving circuit 37 comprises an FET gate driving circuit 371 for driving the gates of field effect transistors (FETs) FET1 to FET4 in accordance with the current control value E supplied from the adder 30B, an H-bridge circuit including the FET1 to FET4, and a boosting power supply 372 for driving the high side of the FET1 and FET2. The FET1 and FET2 are turned on/off in accordance with a PWM signal of a duty ratio D1 determined in accordance with the current control value E and the magnitude of a current Ir actually flowing through the motor 20 is controlled. The FET3 and FET4 are driven in accordance with a PWM signal of a duty ratio D2 defined by a predetermined linear-function formula ("D2=a·D1+b" when assuming "a" and "b" as constants) in a region where the duty ratio D1 is small and turned on/off in accordance with the rotational direction of the motor 20 determined by the code of a PWM signal after the duty ratio D2 also reaches 100%.

FIG. 4 shows the relation between the on/off state of the FET1 to FET4 of the H-bridge circuit shown in FIG. 3 and the current flowing through the motor 20. For example, when the FET3 is turned on, the current flows through the FET1, motor 20, FET3, and resistance R1 (mode A) and a positive-directional current flows through the motor 20. Moreover, when the FET4 is turned on, the current flows through the FET2, motor 20, FET4, and resistance R2 (mode A) and a negative-directional current flows through the motor 20. Therefore, the current control value E supplied from the adder 30B also serves as a PWM output. Furthermore, when the FET1 is turned off and the FET3 is turned on, the current flows through the regenerative diode of the FET4 (mode B). When the FET1 and FET3 are turned off, the magnetic energy stored in the motor 20 is converted into electric energy and the current flows through the regenerative diodes of the FET2 and FET4 (mode C). Then, the motor current detecting circuit 38 detects the magnitude of the positive-directional current in accordance with the voltage drop at the both ends of the resistor R1 and moreover detects the magnitude of the negative-directional current in accordance with the voltage drop at the both ends of the resistor R2. The motor current value "i" detected by the motor current detecting circuit 38 is inputted to the subtracter 30A and feedbacked.

FIGS. 5A and 5B show an effective current Ie and an effective voltage Vm in the modes A to C. That is, the mode B is a regenerative mode in the H-bridge circuit and in the mode B, there is a loss due to substrate resistance or on-voltage of a diode. Therefore, a difference occurs between the occurrence times of the modes A and C. As a result, the effective voltage Vm is generated and an impedance "R=Vm/Ie" is generated.

In the case of the above electric power-steering system, however, when the steering mechanism reaches its limit position as the result of fully turning the steering wheel or when the steering wheel cannot be turned because a tire contacts a curbstone on a road (hereafter, this state is referred to as "end contact"), an excessive current continuously flows through a motor and thereby, the motor is burned because a steering torque is produced by operating the steering wheel though the motor for assisting a steering force is not rotated and thus, electric power is wastefully consumed. Therefore, a structure is used which slowly decreases the current to be supplied to the motor when it is judged that the end contact state occurs.

The end contact state can be judged by directly detecting a steering angular speed by a steering angular speed sensor or in accordance with the angular speed of a motor. To obtain the angular speed of the motor, the following methods are known: a method of detecting the rotational speed of the motor and presuming an angular speed of the motor in accordance with the rotational speed of the motor and a method of presuming a rotational speed of the motor in accordance with a voltage to be supplied to the motor and the motor current and presuming an angular speed of the motor in accordance with the presumed motor rotational speed.

However, the method of detecting the rotational speed of the motor in order to obtain the angular speed of the motor requires new parts such as a rotational-speed sensor and causes the cost to increase. Moreover, when presuming the rotational speed of the motor in accordance with a voltage to be supplied to the motor and the motor current, problems occur that the presumed value of the rotational speed is fluctuated due to the change of environmental temperature or fluctuation in battery voltage and errors are produced.

To solve the above problems, the present applicant proposed a method of presuming an angular speed of a motor in accordance with a back electromotive force generated in the motor, a voltage between terminals of the motor, and a detected motor-current value (refer to Japanese Patent Laid-Open No. 67262/1996).

That is, a back electromotive force KT·ω generated in a motor can be shown by the following expression (1).

$$K_T \cdot \omega = (Vm - Ri) \quad (1)$$

where $K_T$: back electromotive force constant,

ω: angular speed of motor,

Vm: voltage between motor terminals,

R: resistance between motor terminals, and i: motor current (Detected value).

Therefore, the angular speed ω of the motor can be shown by the following expression (2).

$$\omega = (Vm - R \cdot i)/K_T \quad (2)$$

That is, the back electromotive force constant $K_T$ and the resistance R between motor terminals are values intrinsic to the motor and the voltage Vm between terminals of the motor is determined by a battery voltage Vb and a duty ratio D which is an on/off time ratio when driving the motor in accordance with driving pulses (Vm=Vb×D). Therefore, it is possible to presume the angular speed ω of the motor by obtaining a detected motor-current value i.

In the case of the operation of a presumed value of the angular speed ω of the above motor, the back electromotive force constant $K_T$ and the resistance R between terminals of the motor are handled as intrinsic values. These values are determined by the electrical characteristics of a model motor specified in a design specification. However, fluctuation due to manufacturing errors or variation due to the change of operating environmental temperatures occurs in the back electromotive force constant $K_T$ and the resistance R between terminals of the motor to be actually mounted on a vehicle, which are electrical characteristics of the motor. Therefore, a slight error is produced between the electrical characteristics of the model motor and those of the motor to be actually mounted on the vehicle. As a result, an error also occurs in the back electromotive force constant $K_T$ and an error is included in the presumed value of the motor angular speed ω. This error is referred to as an offset error.

When the rotational state of the motor is judged by using the presumed value of the motor angular speed ω including the offset error, an erroneous signal indicating that the motor is rotating may be outputted though a steering wheel is held, that is, the motor does not rotate. To prevent the erroneous signal, it is considered to provide constant dead zones "a" and "a" for the angular speed ω of the motor as shown in FIG. 6 and handle the angular speed ω as zero in a range where the back electromotive force $K_T \cdot \omega$ is small. In this case, however, a problem occurs that the angular speed ω cannot be presumed in the range where the back electromotive force $K_T \cdot \omega$ is small.

Moreover, in general, characteristics of a driving method can be ignored when a PWM-driving frequency is high enough to the electrical time constant of the motor. However, when a motor driving method uses a method of PWM-driving top and bottom FETs located at a diagonal in the H-bridge circuit shown in FIG. 3, a dead zone DB is produced in duty ratio to motor current characteristic as shown in FIG. 7. In FIG. 7, a curve B1 shows normal steering (angular speedω=0) and a curve A1 shows wheel return steering. Because the current intermittently flows at a PWM cycle in a dead zone DB, this case is referred to as "intermittent mode". The intermittent mode is a mode in which a current I becomes equal to "0"in one cycle of PWM as shown in FIG. 8A. When the current I does not become equal to "0" in one cycle as shown by the broken lines in FIG. 8A, the current when I is not zero is sequentially superimposed and a "continuous mode" is set in which the current I increases as shown in FIG. 8B. In the continuous mode, a transient response corresponding to the electrical characteristic of the motor is shown when the PWM cycle is short enough compared to the electrical time constant of the motor. Moreover, in the intermittent mode, because a driving method influences current and the effective voltage applied to the motor, the influence of the driving method on the impedance of a driving system cannot be ignored.

Therefore, in the case of a conventional presuming method in which the influence of a driving system is not considered, a motor angular speed presuming error occurs because an impedance model is different from an actual model. That is, because the conventional presuming method presumes a motor applied voltage in accordance with a duty ratio and a battery voltage, an error occurs in the presumed value of the motor applied voltage. As a result, as shown by the characteristic V1 in FIG. 14, a problem occurs that presumption is executed as if a motor rotates in spite of the fact that the motor does not rotate or an angular speed is presumed as a too small value in a region where current is small. That is, a back electromotive force is obtained as the difference between the characteristic V2 when $\omega$ equals "0" and the actual characteristic V1 on the graph of the current I to the voltage Vm between motor terminals shown in FIG. 14. Therefore, the difference "e" between the characteristic V2 when $\omega$ equals 0 and the actual characteristic V1 becomes an offset error and thus, the presumption is executed as if the motor rotates in spite of the fact that $\omega$ equals 0. Because the conventional presuming model V2 does not consider the impedance in the intermittent mode, an offset error occurs. In FIG. 14, "$\gamma 1$" equals Vm/Ie and "$\gamma 2$" denotes an impedance almost equal to the internal resistance of the motor. The above control system performs the compensation of the inertia of the motor, control of the astringency of the yaw rate of a vehicle, and compensation of the friction of the electric power-steering system. However, these controls do not completely function and thus, the steering performance is deteriorated.

Moreover, in the case of the motor current detecting circuit 38, currents in both directions must be detected for the resistors R1 and R2 and therefore, there is a disadvantage that a bidirectional-detection-type current detecting circuit becomes expensive. When using a unidirectional-detection-type inexpensive current detecting circuit, the effective current Im shown in FIG. 9C must be measured by controlling the FET1 to FET4 by the first duty ratio D1shown in FIG. 9A and the second duty ratio D2 shown in FIG. 9B in the FET gate driving circuit 371. However, when measuring current as the drop voltage generated in the resistors R1 and R2 inserted into an arm in series in the unidirectional-detection-type current detecting circuit, the measurement shown in FIG. 9C cannot be made or the current i(C) in the mode C in FIG. 9D cannot be detected, a detected toothless current is obtained, and resultingly the average current between the currents i(A) and i(B) in the mode C in FIG. 9D is obtained. Therefore, the accurate current Im cannot be detected. That is, it is possible to show the motor current Im actually flowing though the motor 20 in each of the modes A to C in one cycle of a PWM signal by the following expression (3).

$$Im = i(A) + i(B) + i(C) \qquad (3)$$

Moreover, the total sum of the current "i" detected by the unidirectional-detection-type current detecting circuit is shown by the following expression (4) because the current i(C) in the mode C is not detected.

$$i' = i(A) + i(B) \qquad (4)$$

To accurately measure the motor current Im by the unidirectional-type current detecting circuit, it is necessary to hold the current i(B) in the mode B by a sample hold circuit, interpolate the current i(C) in the mode C, and moreover pass the current i(C) through a low-pass filter for removing noises. Therefore, a problem occurs that the cost is inevitably increased.

SUMMARY OF THE INVENTION

The present invention is made to solve the above problems and its object is to provide a controller of an electric power-steering system improving the steering performance of a steering wheel by very accurately presuming a motor angular speed of the electric power-steering system and thereby completely showing the functions for compensating the inertia of a motor and controlling the astringency of a vehicle.

It is another object of the present invention to provide a controller of an electric power-steering system for accurately detecting and correcting a motor current value by using an inexpensive unidirectional-current detecting circuit instead of an expensive circuit such as a sample hold circuit.

The above objects of the present invention are achieved by using a controller of an electric power-steering system for computing a motor current command value in accordance with a steering torque produced in a steering shaft and controlling a motor current in accordance with the computed motor current command value, and supplying a steering assist force corresponding to the steering torque to a steering mechanism, in which motor angular speed computing means for presuming a motor angular speed in accordance with the presumed value of a back electromotive force generated in a motor, motor current detection means for detecting a current flowing through the motor, and control means for controlling the motor current in accordance with the computed motor current command value and the presumed motor angular speed are included, and the motor angular speed computing means is provided with a dead zone having a predetermined width to be determined in accordance with a detected motor-current value or motor current command value to the presumed value of a motor angular speed, and zero is outputted as a presumed motor angular speed independently of a computed motor angular speed presumed value when the computed motor angular speed presumed value is present in the range of the dead zone.

The present invention relates to a controller of an electric power-steering system constituted so as to control a motor for supplying a steering assist force to a steering mechanism in accordance with a current control value computed from a steering assist command value computed in accordance with a steering torque generated in a steering shaft and the current value of the motor. The above objects of the present invention are achieved by very accurately presuming the motor angular speed and thereby, completely showing the functions for compensating the inertia of the motor and controlling the astringency of a vehicle and improving the steering performance. Moreover, it is possible to set a dead zone proportional to a motor current value and change gains of the dead zone in accordance with the intermittent mode and the continuous mode.

The present invention relates to a controller of an electric power-steering system for assist-load-energizing a steering shaft under the control by a motor in which semiconductor elements are connected to an H-bridge circuit and the above objects of the present invention are achieved by having driving means for driving the semiconductor elements of the first arm out of a set of two semiconductor elements constituting two arms of the H-bridge circuit faced each other by a PWM signal having the first duty ratio determined in accordance with a current control value and the semiconductor elements of the second arm out of the two arms by a PWM signal having the second duty ratio defined by the function of the first duty ratio, motor current detection means for detecting a motor current value by the voltage between terminals of a resistor connected between the first and second arms in series, and motor current detecting and correcting means for correcting the motor current value in accordance with the second duty ratio. Moreover, it is possible to constitute the motor current detecting means as unidirectional-current detection means.

BRIEF DESCRIPTION OF THE DRAWINGS

In the accompanying drawings:

FIG. 7 is an illustration showing the characteristic of duty ratio to motor current (voltage between terminals);

FIGS. 8A and 8B are illustrations for explaining an intermittent mode and a continuous mode;

FIGS. 9A to 9D are time charts for explaining operations of an H-bridge circuit;

FIG. 11 is a flow chart for explaining an operation for presuming a motor angular speed, compensation of loss torque and so on;

DESCRIPTION OF THE PREFERRED EMBODIMENTS

First, a method according to the present invention for presuming a motor angular speed $\omega$ when a motor has a small angular speed is described below.

As the result of studying the differences between the electrical characteristic of a model motor and that of an actual motor by noticing the resistance R between motor terminals which is an electrical characteristic of a motor, the resistance R between terminals of the actual motor can be shown by the following expression (5).

$$R = Rm + \Delta Rt + \Delta Rp \tag{5}$$

Where

Rm: resistance between terminals of model motor $\Delta Rt$: fluctuation of resistance between terminals of actual motor due to temperature, and $\Delta Rp$: fluctuation of resistance between terminals of actual motor due to manufacturing error.

Therefore, the voltage Vm between terminals of the actual motor can be shown by the following expression (6).

$$Vm = K_T \cdot \omega + (Rm + \Delta Rt + \Delta Rp) \cdot i \tag{6}$$

Moreover, the voltage $(Vm)_M$ between terminals of the model motor can be shown by the following expression (7)

$$(Vm)_M = (K_T \cdot \omega)_M + Rm \times i \tag{7}$$

Where $(K_T \cdot \omega)_M$: back electromotive force of model motor

Therefore, the presumption error "e" of the back electromotive force can be shown by the following expression (8).

$$e = (K_T \cdot \omega)_M - K_T \cdot \omega = (\Delta Rt + \Delta Rp) \times i \tag{8}$$

Figure 6:
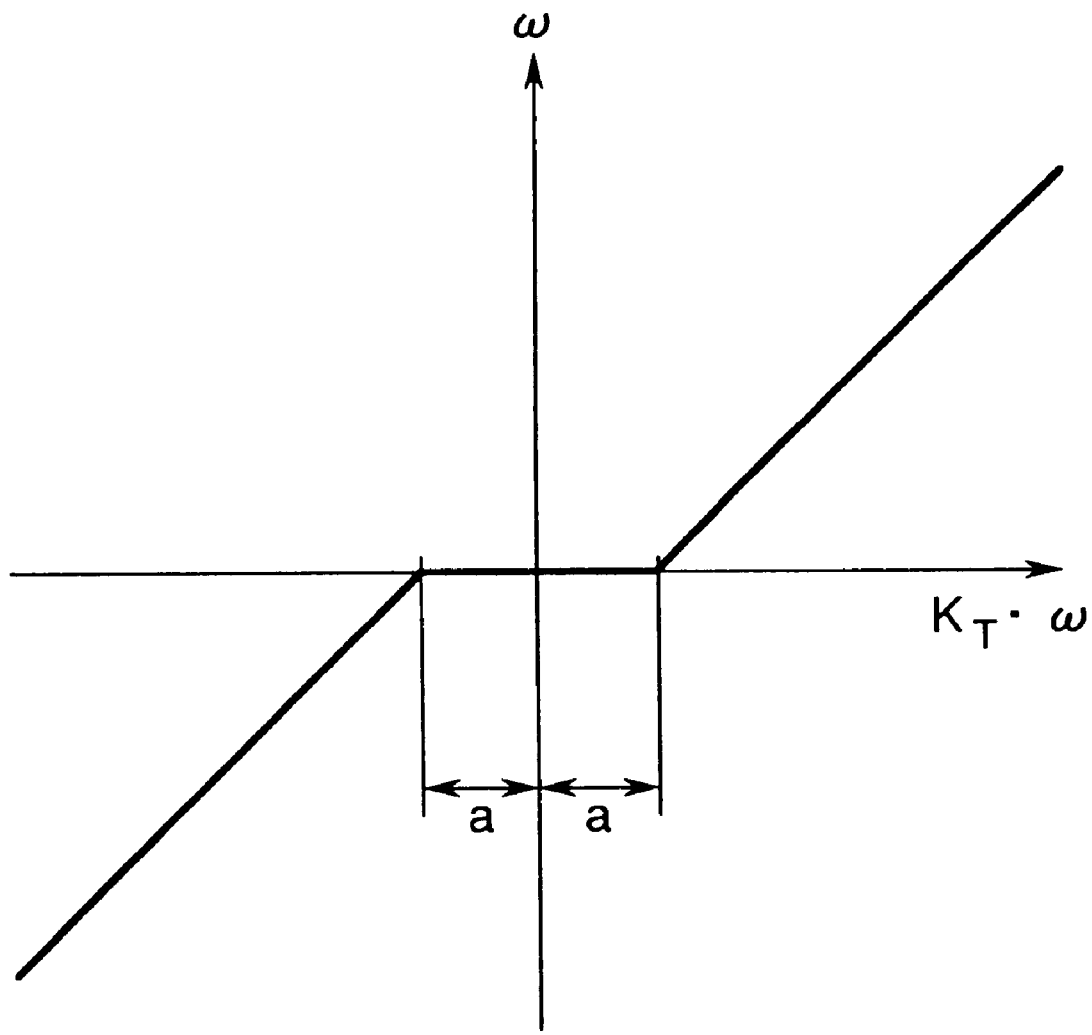
FIG. 6 is an illustration showing the relation between back electromotive force and motor angular speed produced in a motor when rotates.

That is, the presumption error "e" of the back electromotive force is proportional to the motor current i. Therefore, when presuming the motor angular speed $\omega$ in accordance with the presumed value of the back electromotive force and setting the dead zone (having a width "a" in FIG. 6) of the motor angular speed with a width proportional to the motor current, the width of the dead zone decreases when the motor current is small. Therefore, it is possible to presume the angular speed $\omega$ even in a region where the motor angular speed is small.

Therefore, in the case of the present invention, the width "a" of a dead zone to the presumed value of the motor angular speed is set to a value proportional to the motor current i (or a motor current command value; a detected motor-current value in the case of this embodiment) and the proportional coefficient is set to a value larger than the maximum value ($\Delta Rt + \Delta Rp$) of the fluctuation in the voltage between motor terminals. That is, though the width "a" of the dead zone is shown by a=bxi, the proportional coefficient "b" is set to a value larger than ($\Delta Rt + \Delta Rp$).

Thereby, the error of a motor angular speed presumed value according to the presumption error "e" of the back electromotive force is kept in the range of the width "a" of the dead zone and it is possible to eliminate an offset error.

Figure 1:
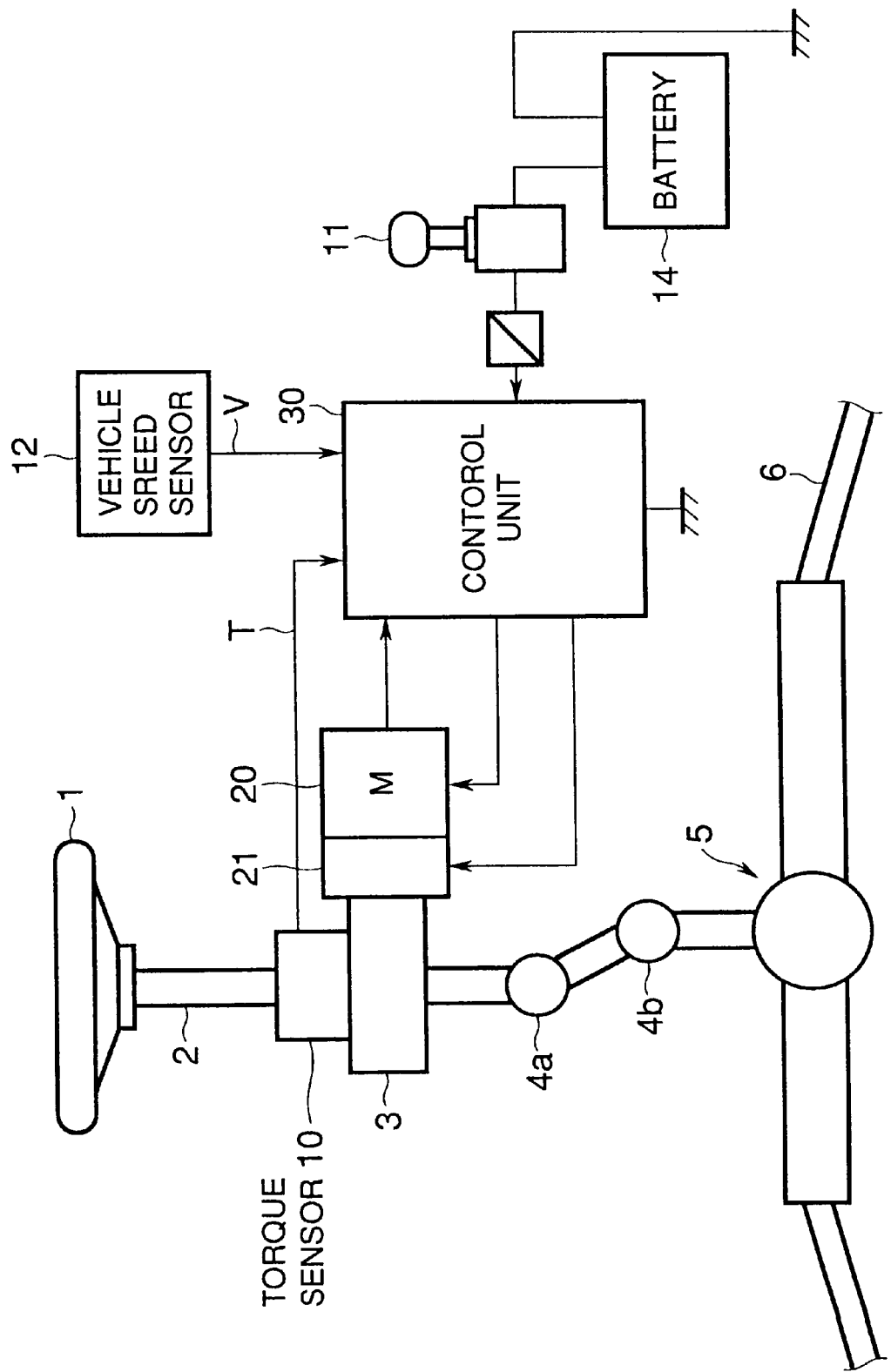
FIG. 1 is a block diagram showing an electric power-steering system.
Figure 2:
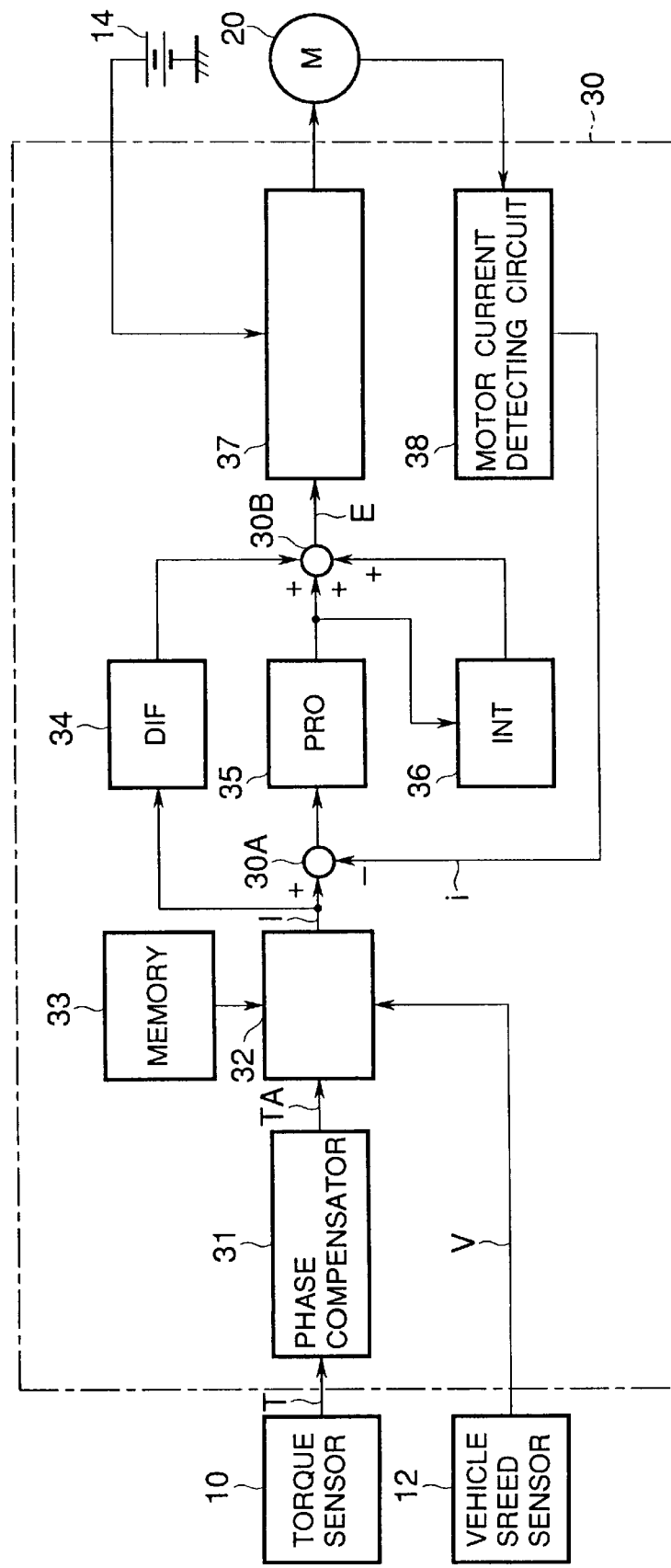
FIG. 2 is a block diagram showing a general internal structure of a control unit.
Figure 10:
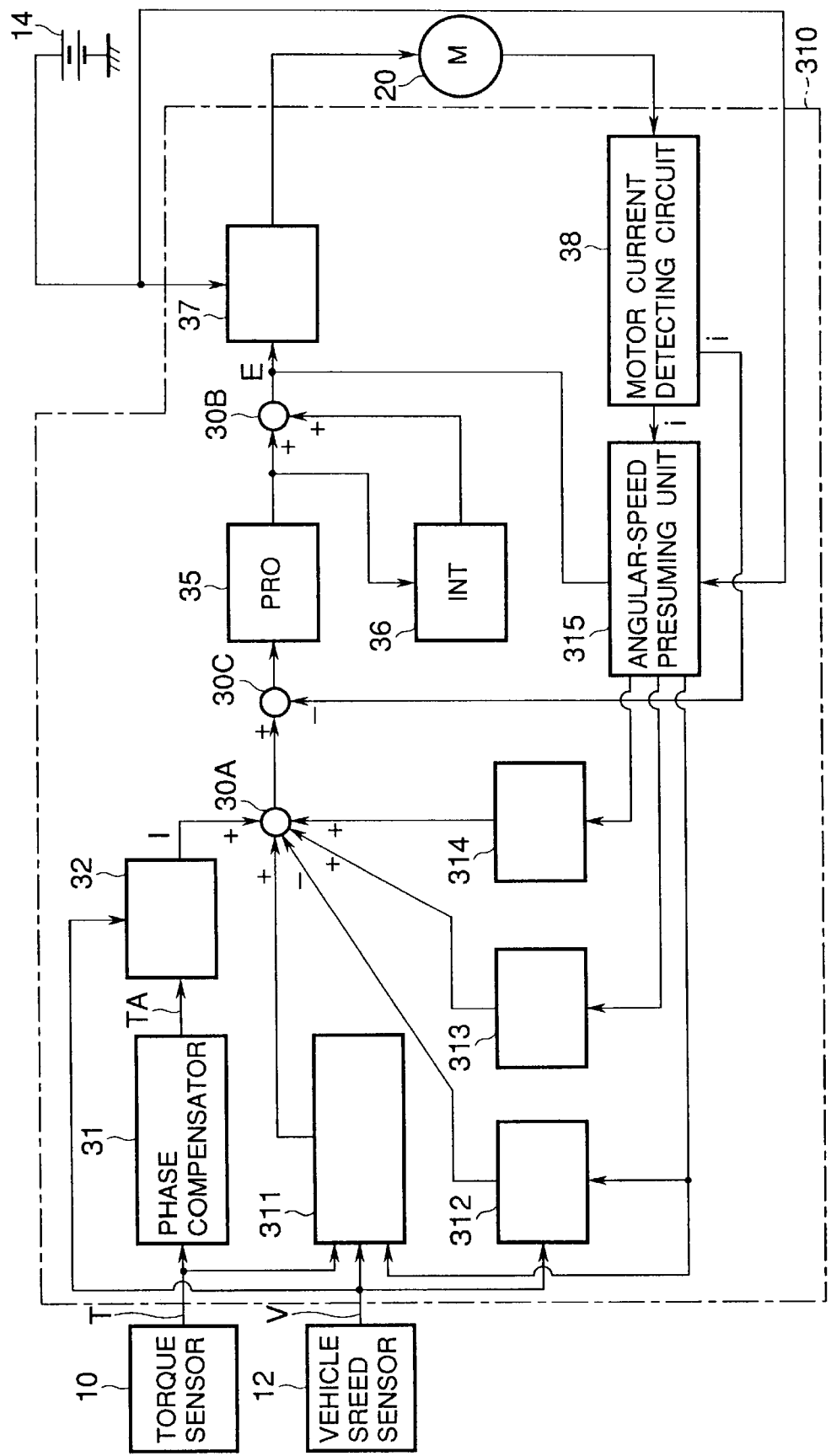
FIG. 10 is a block diagram showing one example of a control unit according to the present invention.

FIG. 10 is a block diagram showing a control unit 310 by making the unit 310 correspond to FIG. 2. In the case of this embodiment, the control unit 310 mainly comprises a CPU. In FIG. 10, functions to be executed by a program in the CPU are shown. For example, a phase compensator 31 does not show a phase compensator 31 serving as independent hardware but it shows a phase compensating function to be executed by the CPU.

Functions and operations of the control unit 310 are described below. A steering torque T from a torque sensor 10 is phase-compensated to improve the stability of a steering system by the phase compensator 31 and inputted to a steering assist command value computing unit 32. Moreover, a vehicle speed V detected by a vehicle speed sensor 12 is also inputted to the steering assist command value computing unit 32. The steering assist command value computing unit 32 determines a motor current command value I which is a control target value of the current to be supplied to the motor 20 in accordance with the steering torque T and the vehicle speed V.

A steering-wheel return controller 311 detects a steering-wheel return state in accordance with the steering torque T, the vehicle speed V, and a motor angular speed presumed by an angular-speed presuming unit 315 to be described later, and performs control so as to set a dead zone when the steering-wheel return state is not detected but performs control so as not to set the dead zone when the steering-wheel return state is detected because the offset error does not occur.

The steering-wheel return state is a state in which a steering wheel automatically returns to the direct advance position due to self-aligning torque set to a steering mechanism after a steering wheel is turned or a state in which a motor is given torque due to the self-aligning torque though the steering torque is not generated. When it is detected according to the vehicle speed signal V that a vehicle currently travels and a motor angular speed (a motor rotates) is detected though the steering torque T is not detected by the torque sensor 10, the steering-wheel return state is decided.

A circuit comprising a subtractor 30C, a proportional computing unit 35, an integral computing unit 36, and an adder 30B is a circuit for performing feedback control so that an actual motor current value i coincides with a current command value Iref from the adding/subtracting unit 30A.

The angular-speed presuming unit 315 presumes a motor angular speed in accordance with the current control value E, the motor current i and the battery voltage Vb. That is, the angular-speed presuming unit 315 computes the voltage Vm (Vm=Vb·D) between motor terminals in accordance with the duty ratio D which is a time ratio of on/off included in the current control value E when driving the motor 20 and the battery voltage Vb and presumes a motor angular speed ω in accordance with the above expression (2).

The computed motor angular speed ω (presumed value) is inputted to not only the steering-wheel return controller 311 but also an astringency controller 312, a loss torque compensator 313 and an inertia compensator 314. The astringency controller 312 astringes the control of a control system in accordance with the motor angular speed ω and the vehicle speed ω and outputs a signal for improving the stability to the adding/subtracting unit 30A. The loss torque compensator 313 outputs a loss torque compensation value for compensating a loss torque produced in the motor 20 to the adding/subtracting unit 30A.

The loss torque includes a friction loss due to a motor structure and a loss due to a magnetic factor, which impairs the steering sense because an unintentional force or an opposite directional force is added to a steering direction when a slight steering is performed during direct advance traveling. To prevent the loss torque, a method is proposed in which a value equivalent to the loss torque is added to a current command value. However, this method adds an opposite-directional steering assist force to a steering direction if a slight drift is present in a detected steering-torque value or it does not effectively function when a steering wheel returns. Therefore, the present invention adds a loss torque compensation value to a current command value in the rotational direction of the motor by noticing that the loss torque is a function (constant) of the rotational direction of the motor.

Moreover, the inertia compensator 314 outputs a compensation value for compensating the influence of the moment of inertia of a steering mechanism including the motor 20 to the adding/subtracting unit 30A so as to add the compensation value to a current command value. That is, when a slight steering is performed during direct advance traveling, an opposite-directional force is added to a steering direction due to the moment of inertia of the steering mechanism and the steering sense is impaired. Because the magnitude of the moment of inertia is shown as a function of a motor angular speed ω, a predetermined current compensation value corresponding to a detected angular speed ω is added to the current command value to compensate the influence of the moment of inertia.

Figure 11:
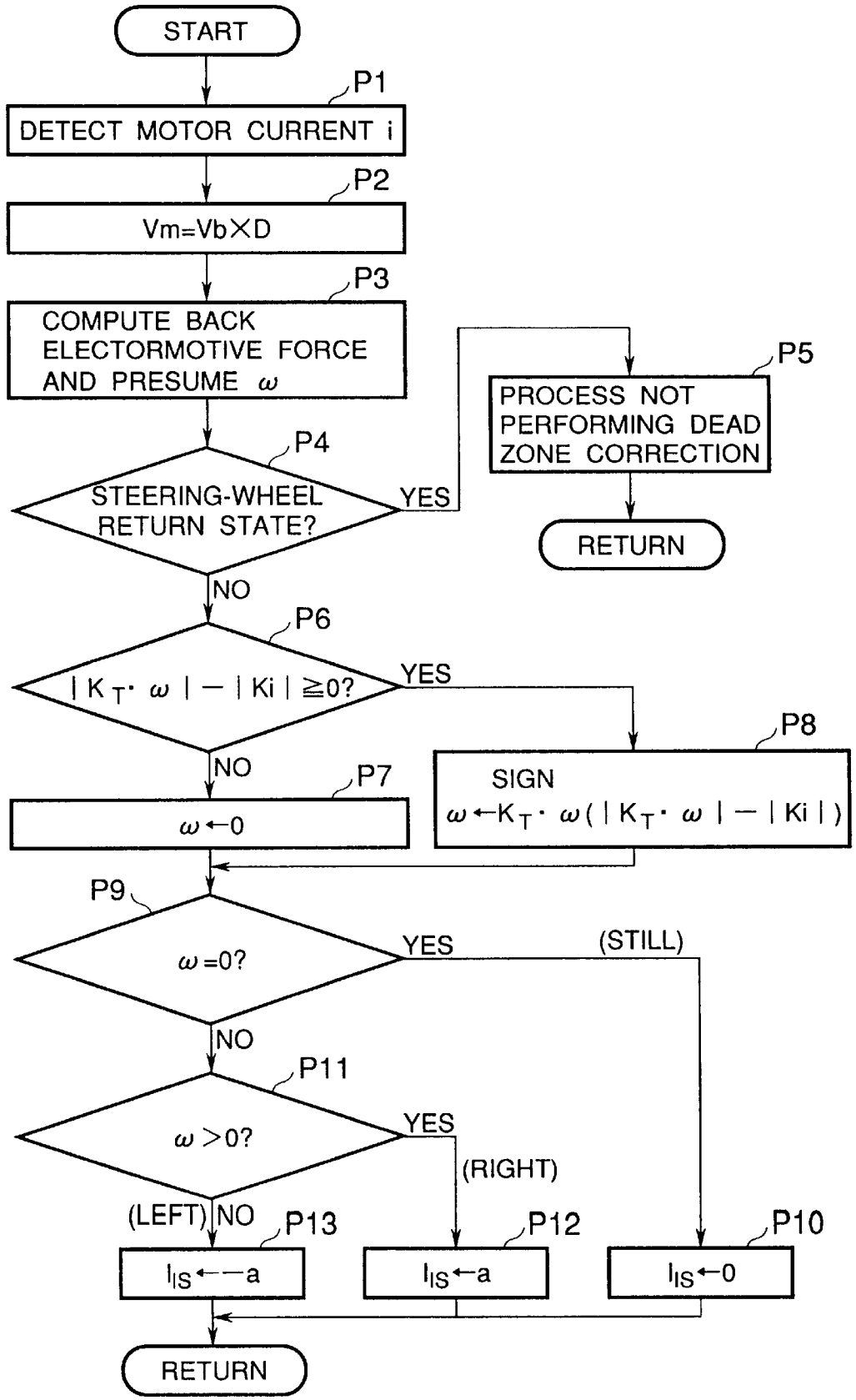

Then, the presumption of a motor angular speed ω, judgement on a steering-wheel return state, determination of a motor rotational direction, and determination of a loss torque value to be executed by the control unit 310 are described below by referring to the flow chart in FIG. 11.

First, a motor current "i" is detected by the motor current detecting circuit 38 (Step P1) and moreover, a voltage Vm between motor terminals is computed in accordance with a battery voltage Vb and a duty ratio D (Step P2). Then, the voltage Vm between motor terminals, the resistance R between motor terminals, and the detected motor current i are substituted for the above expression (2) to presume a back electromotive force $K_T \cdot \omega$ of the motor 20, and this is divided by the back electromotive force constant $K_T$ which is the characteristic value of the motor 20, in order to presume a motor angular speed ω (Step P3). This processing corresponds to the processing by the angular speed presuming unit 315 in FIG. 10.

When the motor angular speed ω shows a finite value, a steering-wheel return state is judged in accordance with the vehicle speed V detected by the vehicle speed sensor 12 and the steering torque T detected by the torque sensor 3 (Step P4). That is, when the direction of the motor angular speed ω does not coincide with the direction of the steering torque T under a traveling state, the steering-wheel return state is judged. When the steering-wheel return state is judged, control is performed so that dead zone correction is not applied to the presumed value of the computed motor angular speed ω, that is, the motor angular speed ω (presumed value) is proportional to the back electromotive force $K_T \cdot \omega$ (Step P5).

Moreover, when it is judged as the result of the judgment at the Step P4 that the state is not a steering-wheel return state, processing of a dead zone with a width proportional to the current value i at which the motor angular speed ω comes to zero is performed in a certain range of the back electromotive force $K_T \cdot \omega$. This processing corresponds to the processing by the steering-wheel return controller 311 in FIG. 10. That is, it is judged whether the difference between the absolute value of the back electromotive force $K_T \cdot \omega$ (presumed value) and the absolute value of the dead zone (value "k·i" obtained by multiplying the detected current value i by a constant "k") is equal to or larger than "0" ($|K_T \cdot \omega| - |K \cdot i| \geq 0$) (Step P6). When the difference is not larger than "0", that is, when the back electromotive force $K_T \cdot \omega$ (presumed value) is present in the range of the dead zone, the motor angular speed ω is forcibly set to zero (Step P7). When the difference is larger than zero, a sign of the back electromotive force $K_T \cdot \omega$ and $(|K_T \cdot \omega| - |K \cdot i|)$ are set as the angular speed co (presemed value) (Step P8).

It is judged whether the motor angular speed $\omega$(presumed value) is zero (Step P9). When the motor angular speed $\omega$ is zero, a loss torque compensation value IIs is set to zero because the motor 20 is stopped (Step P10). Moreover, when the motor angular speed $\omega$ (presumed value) is not zero as the result of the judgment at the Step P9, it is judged whether the sign of the motor angular speed $\omega$ (presumed value) is positive or not ($\omega > 0$) (Step P11). When the sign is positive, it is determined that the motor rotates, for example, clockwise and the loss torque compensation value $I_{LS}$ is set to a preset value "a" (Step P12). When the sign is not positive, that is, negative, it is determined that the motor rotates, for example, counter-clockwise and the loss torqued compensation value $I_{LS}$ is set to a predetermined value "−a" (Step P13).

Moreover, the present invention makes it possible to very accurately presume a motor angular speed by defining impedance models of motor driving systems different from each other in the intermittent mode and the continuous mode and moreover considering the influence of a driving method on the impedance of the driving system. Moreover, in the case of the present invention, a dead zone proportional to a current value is set in order to compensate a presumption error produced caused by the change of impedance characteristics of a motor driving system due to temperature fluctuation so that a gain of the dead zone is changed in the intermittent mode and continuous mode. Furthermore, it is possible to compensate the presumption error due to temperature fluctuation by measuring or presuming a motor temperature.

An embodiment of the present invention is described below by referring to the accompanying drawings.

Figure 12:
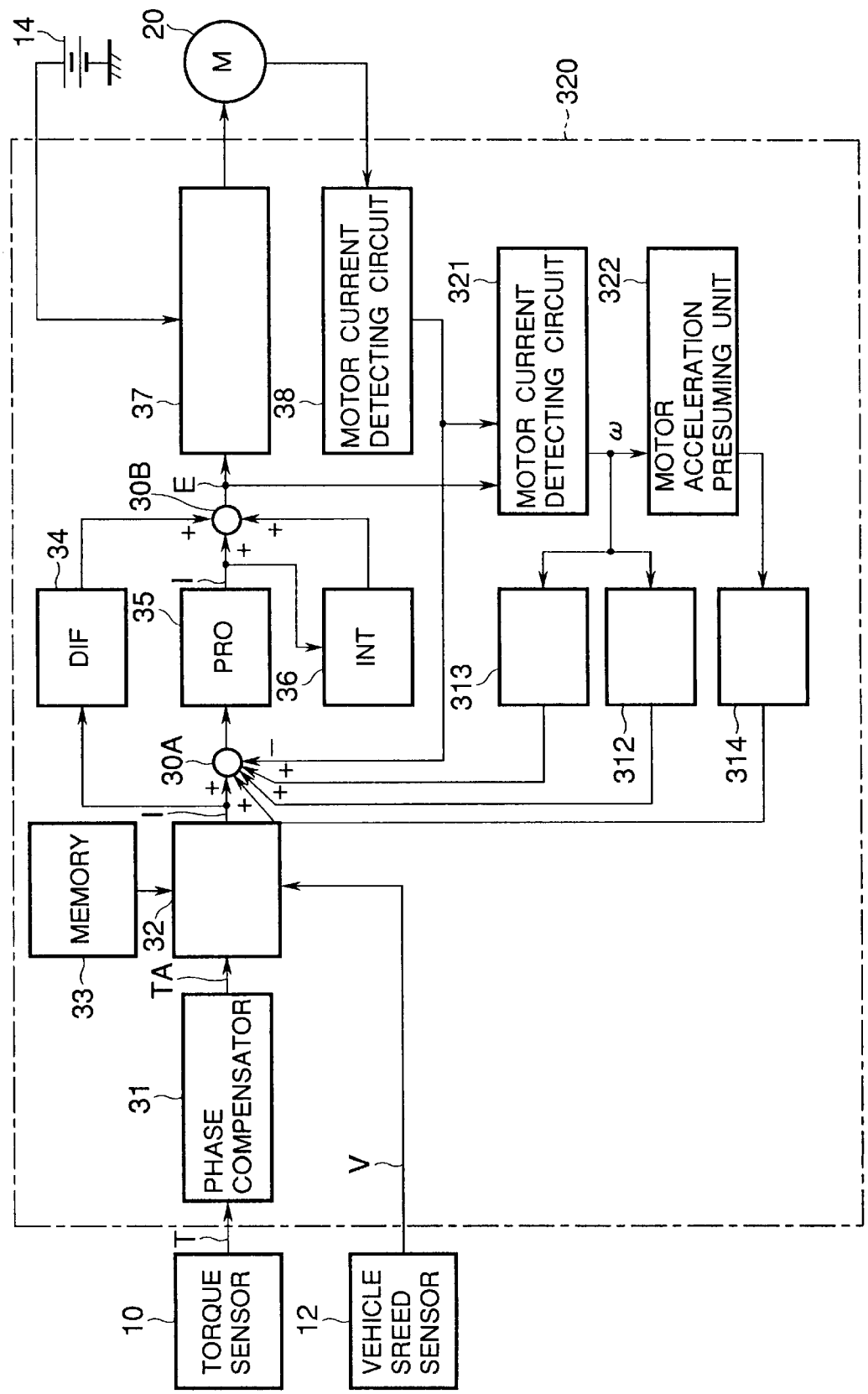
FIG. 12 is a block diagram showing a structure of the present invention.

First, presumption of a motor angular speed $\omega$ and its compensation form of the present invention are shown in FIG. 12 by making them correspond to FIGS. 2 and 10. A motor angular-speed presuming unit 321 in a control unit 320 presumes a motor angular speed $\omega$ in accordance with a current control value E (corresponding to a voltage between motor terminals) and a motor current value "i" and inputs the presumed motor angular speed $\omega$ to the loss torque compensator 313 and the astringency controller 312. The output of the loss torque compensator 313 and that of the astringency controller 312 are inputted to the adding/subtracting unit 30A, the loss torque compensator 313 performs assist corresponding to a loss torque in the direction in which the loss torque of the motor 20 is produced, that is, in the rotational direction of the motor 20, and the astringency controller 312 applies a brake to whirling of a steering wheel in order to improve the astringency of the yaw of a vehicle. Moreover, the motor angular speed $\omega$ is inputted to a motor acceleration presuming unit (differentiator) 322 in which a motor acceleration is presumed and the motor acceleration is inputted to the inertia compensator 314, and the compensation signal of the inertia compensator 314 is inputted to the adding/subtracting unit 30A. The inertia compensator 314 assists a value corresponding to a force produced due to the inertia of the motor 20 to prevent an inert sense or control response from deteriorating.

Figure 5A:
FIGS. 5A and 5B are illustrations showing effective voltage and effective current in the modes A to C.
Figure 5B:
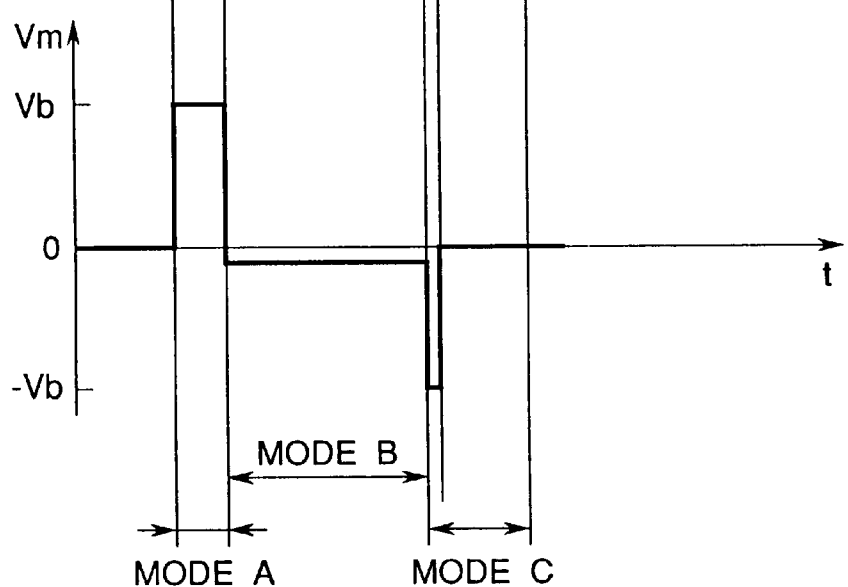
Figure 13A:
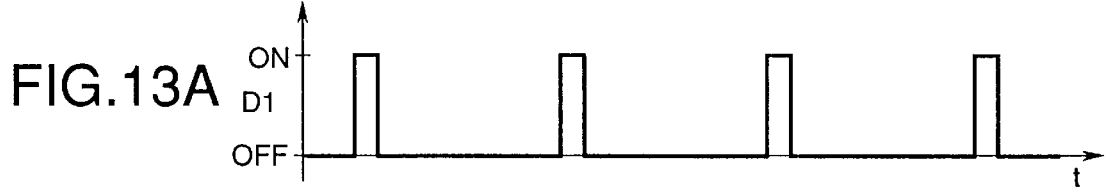
FIGS. 13A to 13E are illustrations for explaining operations of the present invention.
Figure 13B:
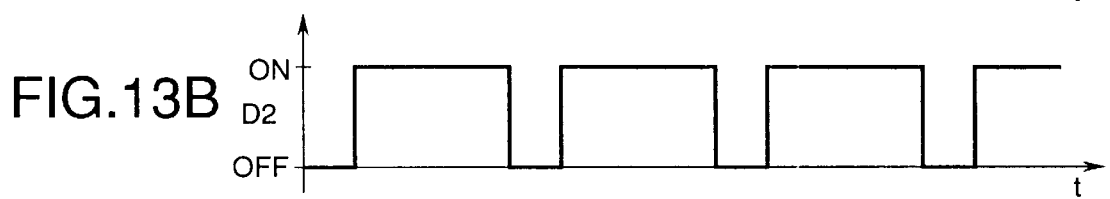
Figure 13C:
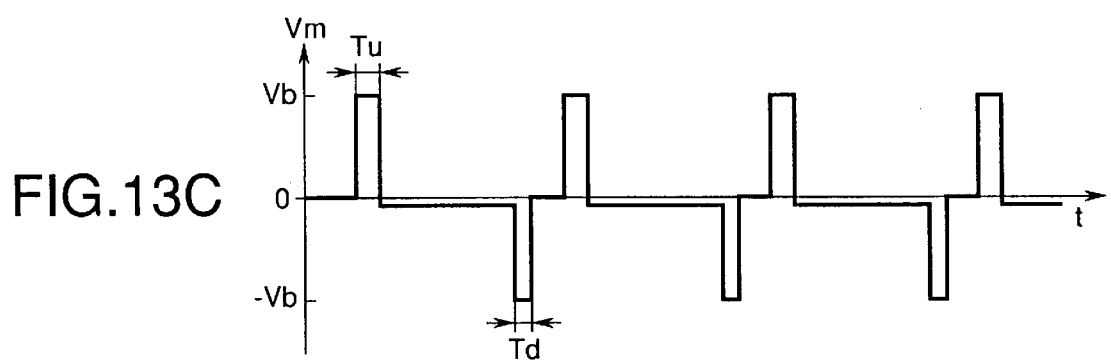
Figure 13D:
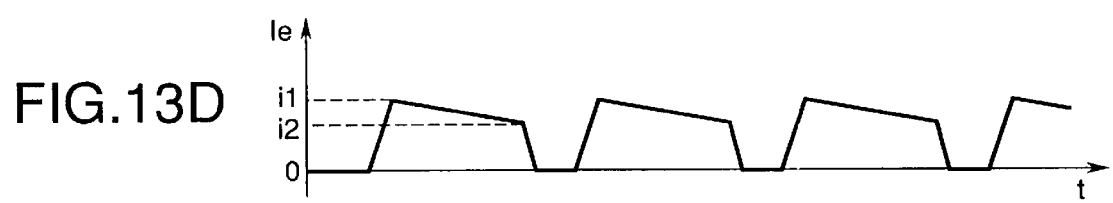
Figure 13E:
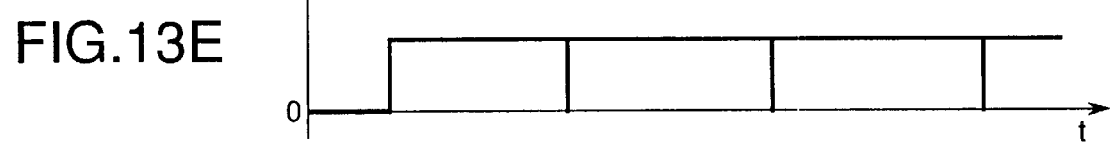
Figure 14:
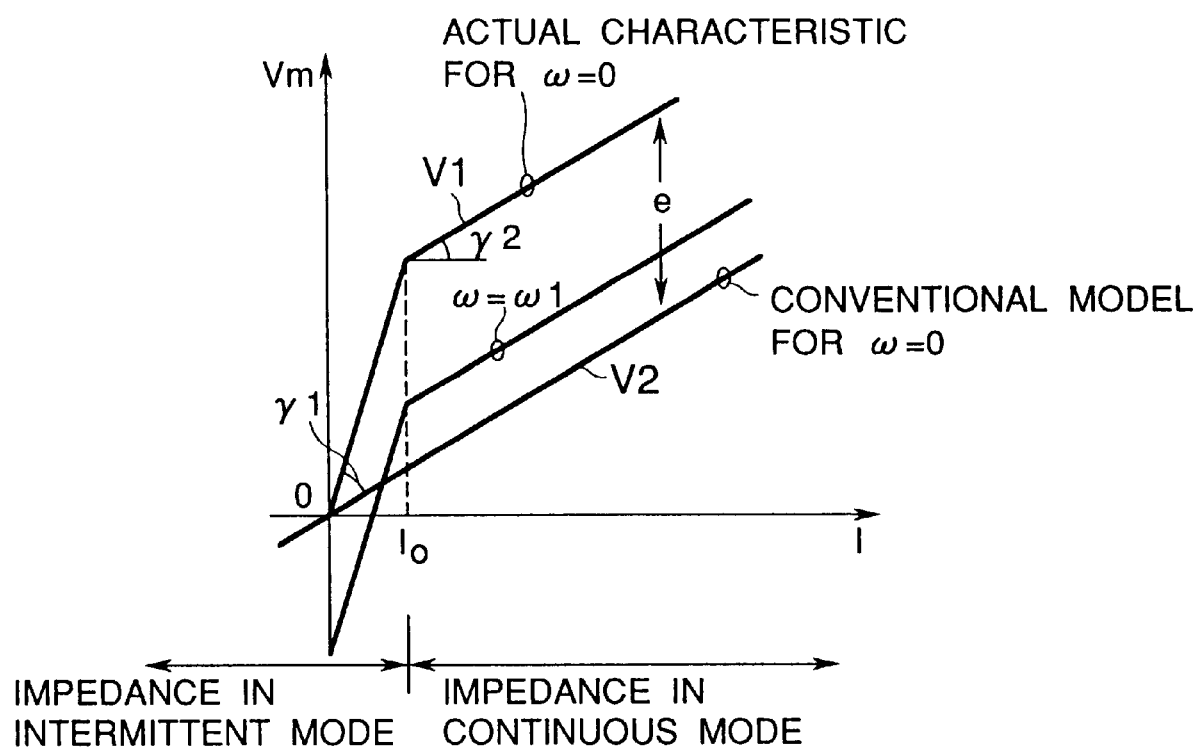
FIG. 14 is an illustration showing the relation of motor current to voltage between motor terminals of the present invention in comparison with the case of a conventional example.

In the case of the present invention, impedance is generated in the intermittent mode because the time constant in the regenerative mode (mode B) is increased due to on-voltage of a diode or on-resistance of FETs compared to the time constant at the time of rise or fall as shown in FIGS. 13A to 13E correspondingly to FIGS. 5A and 5B and as a result, an effective voltage Ve is generated. FIG. 13C shows the voltage Vm between motor terminals, FIG. 13D shows the motor current value (effective current) Ie, and FIG. 13E shows a detected current value Id. Because the intermittently-flowing effective current value Ie and the detected current value Id are monitored as shown in FIGS. 13D and 13E in a control unit 320, the control unit 320 recognizes that a motor driving system has an impedance obtained from the effective current value Ie. As a result, the impedance is recognized as the impedance shown by the current-to-voltage characteristic shown in FIG. 14. In FIG. 14, V1 shows an actual characteristic, V2 shows a conventional model, and a presumption error "e" is produced between V1 and V2.

In this case, when calculating an impedance Rd in the intermittent mode due to FIGS. 13A to 13E, it is shown by the function of the duty ratio D1 as shown by the following expression (9). In FIG. 14, the region smaller than a current $I_o$ indicates impedance in the intermittent mode, and the region larger than the current $I_o$ indicates impedance in the continuous mode.

$$Rd = (m1 \cdot D1^2 = m2 \cdot D1)/(m3 \cdot D1^2 + m4 \cdot D1 + m5) \tag{9}$$

where m1, m2, m3, m4 and m5: constants determined by the PWM cycle of a battery voltage Vb and the time constant of the motor 20.

However, for practical use, it is possible to approximate Rd to an impedance R1 of a constant value. The inflection point from the intermittent mode to the continuous mode actually changes in accordance with a motor angular speed. However, because the impedance in the intermittent mode is large enough, it is possible to consider that the inflection occurs when a certain current value is produced. Therefore, because impedance models for the presumption are changed by detecting a current Io, it is possible to define the impedance model shown by the following expression (10).

$$\left.\begin{array}{l} \text{In the case of } I < I_o, \\ K_T \cdot \omega = Vm - R1 \cdot i \\ \text{In the case of } I \geq I_o, \\ K_T \cdot \omega = Vm - (R2 \cdot i + b) \end{array}\right\} \tag{10}$$

where $K_T \cdot \omega$ : a presumed value of a back electromotive force, $I_o$: a current value when the intermittent mode is changed to the continuous mode, R1: an impedance in the intermittent mode at a reference temperature, and R2: an impedance in the continuous mode at the reference temperature.

Figure 15:
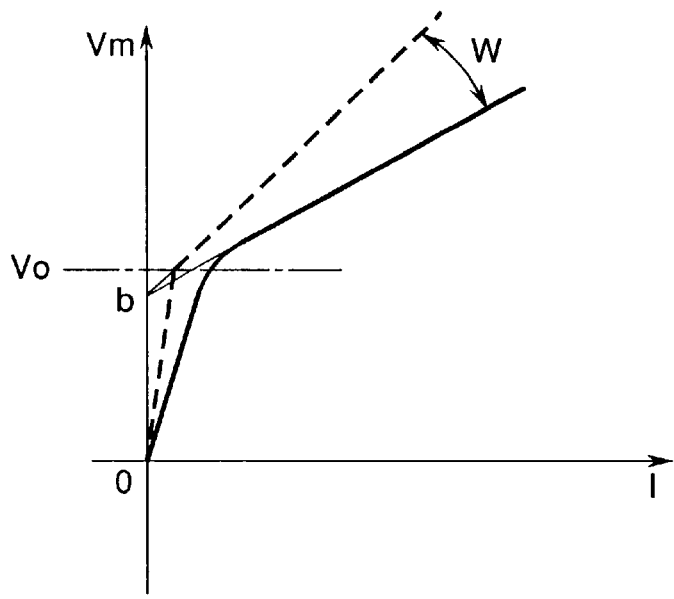
FIG. 15 is an illustration for explaining impedance change due to temperature.

Moreover, the characteristic of an actual motor driving system is influenced by temperature fluctuation. A dead zone proportional to a current value has been set so far in order to eliminate the influence of the temperature fluctuation. Also in the case of the present invention, it is possible to eliminate the modeling error of an internal resistance of a motor and the influence of the temperature fluctuation by setting a dead zone proportional to a current value. In this case, it is qualitatively known that an impedance line always passes through the origin in the intermittent mode and always passes through an intercept in the continuous mode independently of temperature fluctuation as shown in FIG. 15. Therefore, it is understood that the dead zone can be set under the following conditions. In FIG. 15, symbol W denotes a width in which the impedance characteristic is present due to temperature fluctuation $V_o$ denotes a voltage value between motor terminals at which the impedance characteristic inflects.

$$\left.\begin{array}{l}\text{In the case of } I < I_o/K, \\ *K_T \cdot \omega = K_T \cdot \omega - K1 \cdot i \\ \text{In the case of } I \geq I_o/K, \\ *K_T \cdot \omega = K_T \cdot \omega - K2 \cdot i\end{array}\right\} \quad (11)$$

where

K1: a dead-zone proportional constant in the intermittent mode,

K2: a dead-zone proportional constant in the continuous mode, and

K: a ratio between the impedance in the intermittent mode at the reference temperature and the impedance after influenced by temperature fluctuation.

The above embodiment compensates the influence of the temperature fluctuation by setting the dead zone. When the temperature fluctuation is large, however, it is preferable to compensate the influence of the temperature fluctuation by presuming or measuring a motor temperature. The inflecting position is almost constant ($V_o$) in view of a motor applied voltage independently of temperature as shown in FIG. 15. This is because duty ratios of upper-and lower-stage FETs are predominant and a motor applied voltage is determined by the function of only the duty ratio and the battery voltage. Moreover, the current in the intermittent mode decreases as the internal resistance of the motor increases. Therefore, the temperature fluctuation of a motor driving system changes as shown by the broken line in FIG. 15. Therefore, temperature compensation can be performed under the conditions shown by the following expression (12).

$$\left.\begin{array}{l}\text{In the case of } I < I_o/K_Y, \\ K_T \cdot \omega = Vm - R_{1T} \cdot i \\ \text{In the case of } I \geq IO/KY, \\ K_T \cdot \omega = Vm - (R_{2T} \cdot i + b)\end{array}\right\} \quad (12)$$

where $R_{1T}$: an impedance in the intermittent mode at a temperature T, $R_{2T}$: an impedance in the continuous mode at a temperature T, and $K_Y$ equals $R_{1T}/R_{2T}$.

Figure 16:
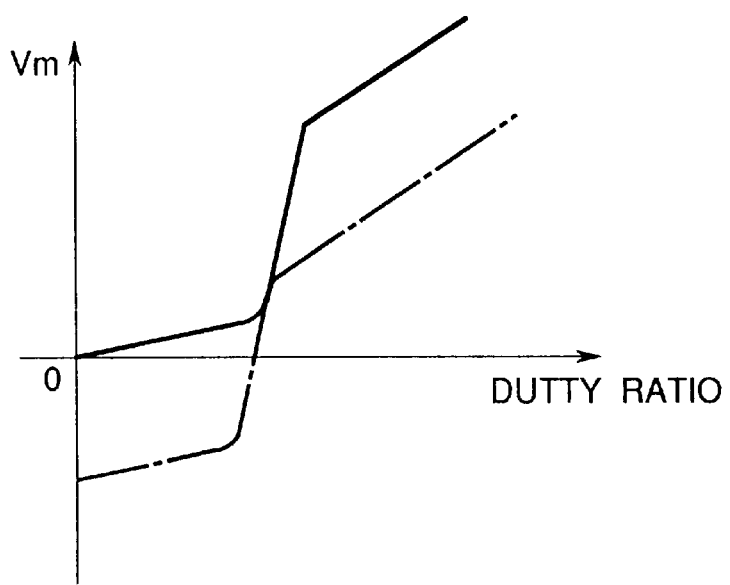
FIG. 16 is an illustration showing the relation of duty ratio to voltage between motor terminals when using motor angular speed as a parameter.

Change of the impedance models of the motor may depend on not only the temperature fluctuation but also a manufacturing error. Therefore, it is possible to perform more accurate presumption by performing correction together with a correction method using the dead zone. Though the motor applied voltage has been presumed by a duty ratio so far, it is preferable to directly use the motor applied voltage as a monitor because the relation between the motor applied voltage using the motor angular speed as a parameter and a duty ratio has a nonlinear characteristic as shown in FIG. 16. In FIG. 16, the continuous line shows the case of normal steering and the chain line shows the case of steering-wheel return steering.

Figure 3:
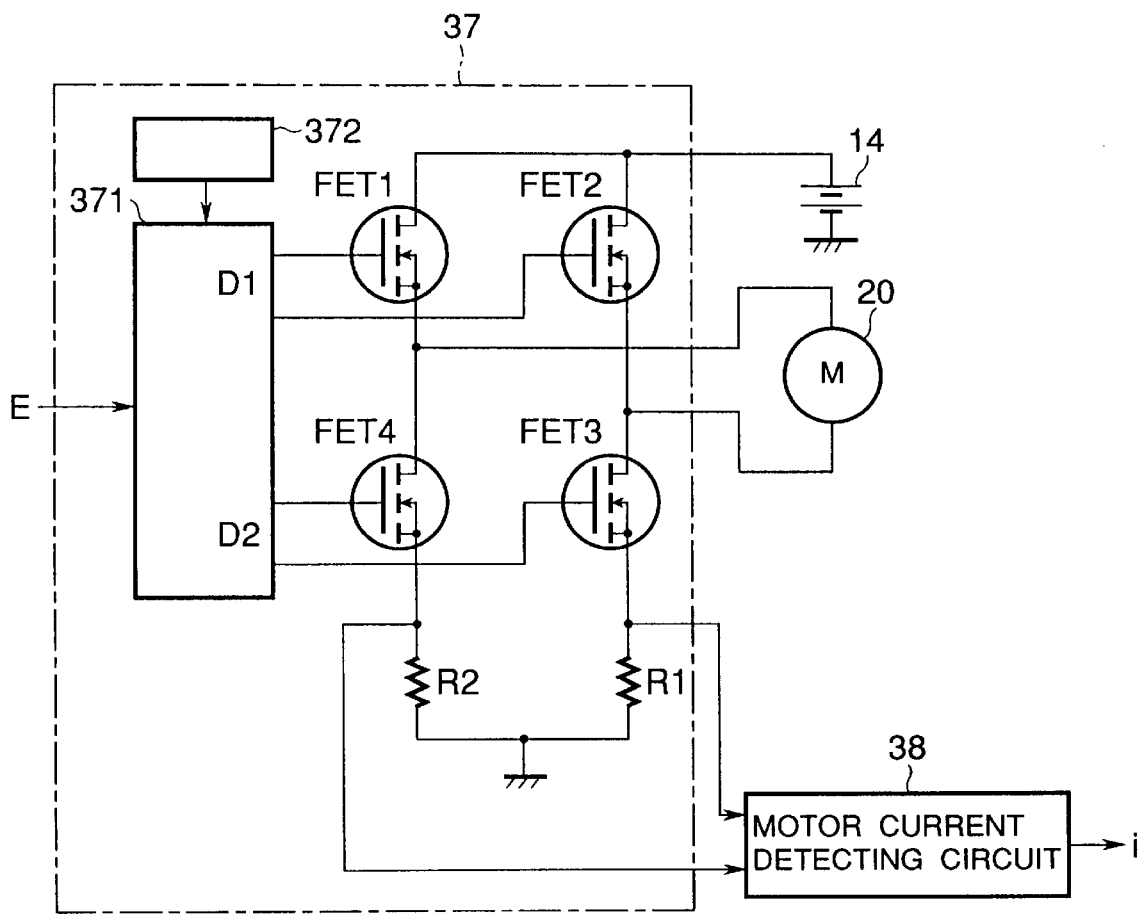
FIG. 3 is a connection diagram showing a motor driving circuit.
Figure 4:
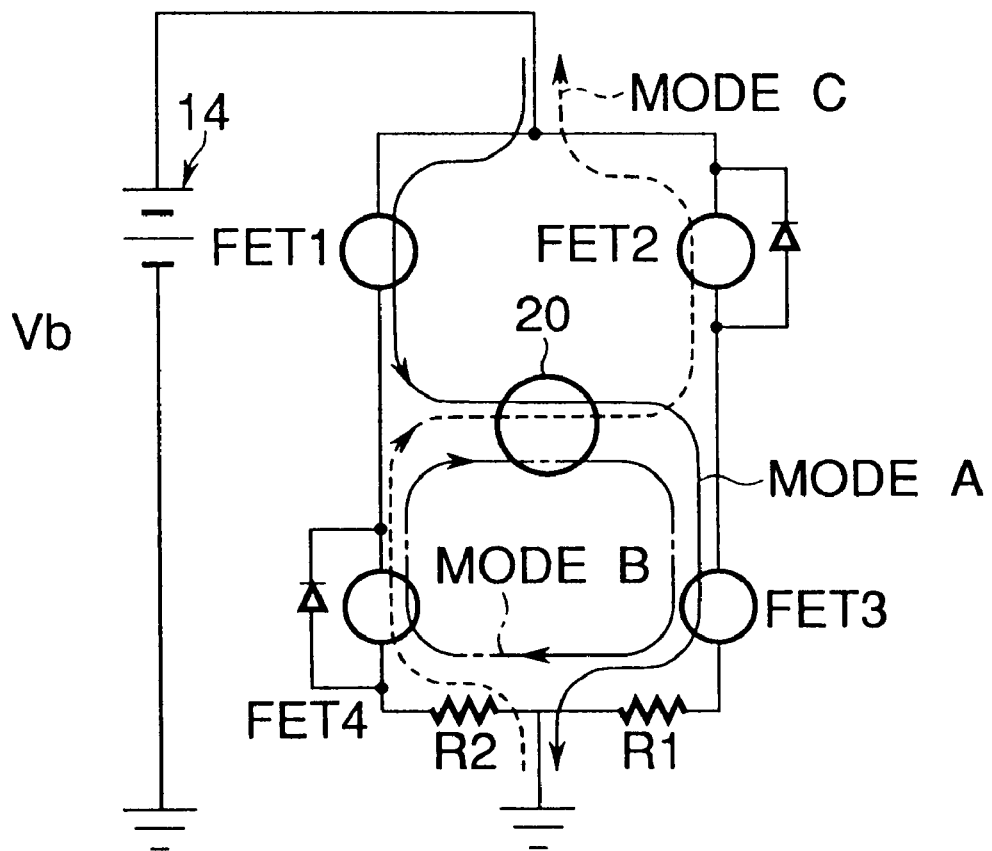
FIG. 4 is an illustration showing current paths of an H-bridge circuit.
Figure 17:
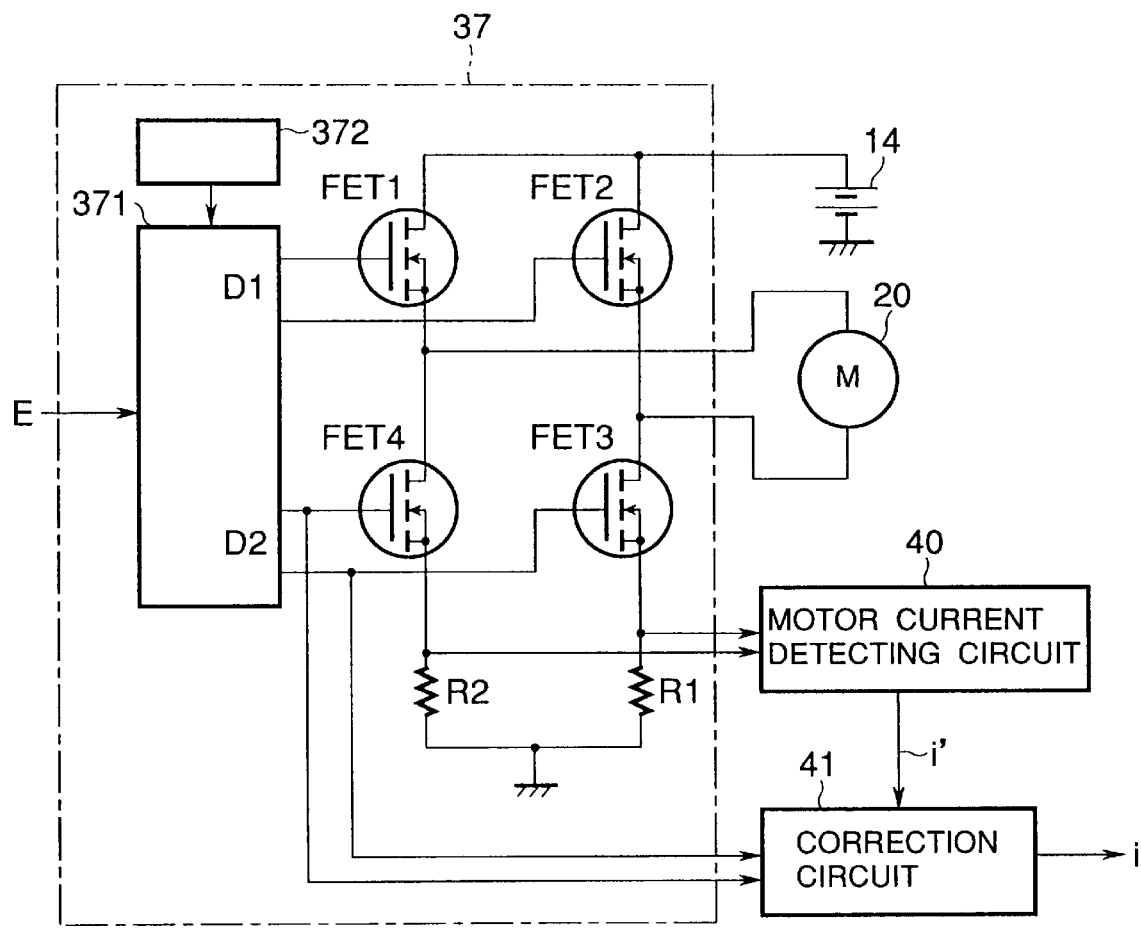
FIG. 17 is a block diagram showing an embodiment of the present intention.

Moreover, as shown in FIG. 17 corresponding to FIG. 3, the present invention detects a current value i' by a unidirection-type motor current detecting circuit 40 in accordance with voltage drops in the resistors R1 and R2, corrects the current value i' detected at the second duty ratio D2, and uses the corrected current value i as a feedback current. That is, the present invention detects the current i' corresponding to FIG. 9D by the unidirectional-detection-type current detecting circuit 40 connected to the resistors R1 and R2 of the H-bridge circuit and inputs the current i' to a correction circuit 41. The correction circuit 41 corrects the inputted current i' in accordance with the duty ratio D2 supplied from the FET gate driving circuit 371 and returns the corrected current value i to the subtractor 30A. The correction circuit 41 can correspond to the software of a CPU.

Figure 18:
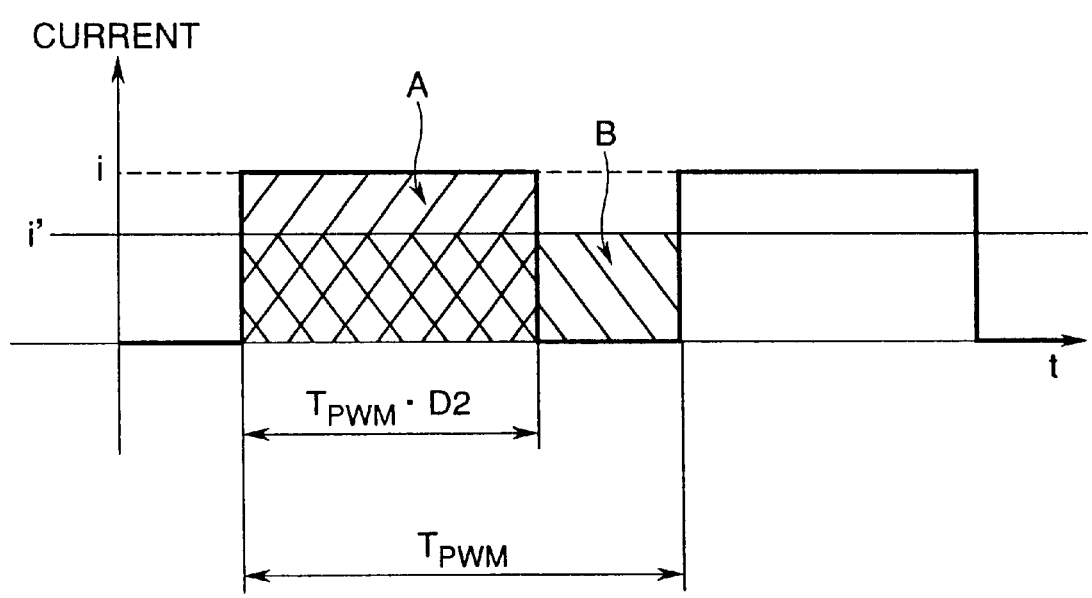
FIG. 18 is a waveform diagram for explaining the principle of the present invention.

In the case of a time $T_{PWM}$ of one cycle of PWM, current can be regarded to be in an equilibrium state and it can be assumed that current ripple is small enough for the effective value Ir of the current. Therefore, FIG. 9D which is a detected current waveform can be approximated to the continuous line waveform in FIG. 18. The waveform in FIG. 18 can be obtained as a detected current value passing through a low-pass filter for anti-aliasing for noise reduction or digitalization. Because the cut-off frequency of the low-pass filter is low enough compared to the frequency of PWM, the current value i' detected by the motor current detecting circuit 40 has a height of a region B shown by right-down lines obtained by averaging the area of a region A shown by right-up lines in FIG. 18 by one-cycle time $T_{PWM}$. In this case, the following expression (14) is effected because the area of the region A equals that of the region B.

$$i' \cdot T_{PWM} = i \cdot T_{PWM} \cdot D2 \quad (14)$$

Thus, the following expression (15) is led.

$$i' = T_{PWM} \cdot D2/T_{PWM} \cdot i = D2 \cdot \quad (15)$$

In the expression (15), the detected current value i' has an error equivalent to the duty ratio D2 on the current value i to be obtained. Therefore, the detected current value i' is corrected by the correction circuit 41 in accordance with the following expression (16) to obtain the effective value i of current.

$$i = i'/D2 \quad (16)$$

Thereby, it is possible to correct the error of the detected current value i' by the motor current detecting circuit 40 without using a sample hold circuit.

In the case of the above embodiment, a system for driving duty ratios different at upper and lower stages from each other is described as an H-bridge circuit. However, the embodiment can be also applied to the sign magnitude system (Japanese Patent Publication No. 182874/1991) and the upper- and lower-stage simultaneous PWM driving system (Japanese Patent Laid-Open No. 299476/1987).

As described above, a controller of an electric power-steering system according to the present invention sets a dead zone having a predetermined width to be determined in accordance with a detected motor current value or motor current command value to the presumed value of a motor angular speed in order to compensate an error (offset error) of the presumed value of the motor angular speed ω according to the difference between the electrical characteristic of the motor determined by design specification and the electrical characteristic of a motor to be actually mounted on a vehicle in the computation of the presumed value of the motor angular speed ω and decreases the presumed motor angular-speed value to zero independently of the computed motor angular-speed estimated value when the motor angular-speed presumed value is kept in the range of the dead zone. Therefore, it is possible to presume a motor angular speed even in a region where the motor angular speed is small.

Thereby, it is possible to presume a motor angular speed even when a slight steering is performed during direct advance traveling and accurately detect the stopped state or rotational direction of a motor. Therefore, it is possible to improve the steering sense when a slight steering is performed under direct advance traveling by adding (or subtracting) a lost torque compensation value to (or from) a current command value in accordance with the rotational direction of the motor judged in accordance with the sign of a motor angular speed.

In the case of the present invention, the influence of a driving method on a driving-system impedance is considered by defining the impedance models of the motor driving systems different from each other in the intermittent mode and the continuous mode and a motor angular speed is presumed by eliminating the influence. Therefore, it is possible to presume the motor angular speed at a high accuracy. Thereby, it is possible to compensate the influence of inertia and the friction of the motor at a high accuracy. Moreover, in the case of the present invention, a dead zone proportional to a current value is set in order to compensate a presumption error produced due to impedance characteristic change of a motor driving system caused by temperature change so as to change gains of the dead zone in the intermittent mode and the continuous mode.

As described above, a controller of an electric power-steering system according to the present invention is provided with motor current detecting means and the correction means for correcting a motor current value detected by a unidirectional-current detecting circuit by a second duty ratio. Therefore, it is possible to correct the error of a detected motor current value without using a sample hold circuit and decrease the cost without changing functions.

What is claimed is:

1. A controller of an electric power-steering system for computing a motor current command value in accordance with a steering torque produced in a steering shaft, controlling a motor current in accordance with the computed motor current command value, and supplying a steering assist force corresponding to the steering torque to a steering mechanism, the controller comprising:

motor angular speed computing means for presuming a motor angular speed in accordance with the presumed value of a back electromotive force produced in a motor;

motor current detecting means for detecting a current flowing through the motor; and control means for controlling a motor current in accordance with the computed motor current command value and the presumed motor angular speed value;

wherein a dead zone having a predetermined width to be determined for the presumed value of a motor angular speed in accordance with a detected motor current value or motor current command value is set to said motor angular speed computing means to output zero as a motor angular speed presumed value independently of a presumed motor angular speed value when the presumed motor angular speed value is kept in the range of the dead zone.

2. A controller of an electric power-steering system according to claim 1, wherein the dead zone set to said motor angular speed computing means is set to a value larger than the fluctuation width of a presumed motor angular speed value produced due to the fluctuation in the voltage between motor terminals caused by the fluctuation in the resistance between motor terminals due to temperature change of the motor and the fluctuation in the voltage between motor terminals caused by the fluctuation in the resistance between motor terminals produced when manufacturing the motor.

3. A controller of an electric power-steering system according to claim 1, wherein said control means outputs a rotational-direction identification signal for identifying the rotational direction of the motor in accordance with the presumed motor angular speed value outputted from said motor angular speed computing means.

4. A controller of an electric power-steering system according to claim 3, wherein said control means outputs a motor loss-torque correction signal in accordance with said motor rotational-direction identification signal.

5. The controller of an electric power-steering system according to claim 1, wherein said control means outputs a viscosity correction signal for correcting the viscosity of a steering mechanism in accordance with the presumed motor angular speed value outputted from said motor angular speed computing means.

6. A controller of an electric power-steering system according to claim 1, wherein said control means performs a processing for disabling the dead zone set to said motor angular speed computing means when a steering-wheel return state is detected.

7. A method for controlling an electric power-steering system for controlling the motor for supplying a steering assist force to a steering mechanism in accordance with a current control value computed from a steering assist command value and a motor current value computed in accordance with a steering torque produced in a steering shaft, the method comprising the steps of computing a back electromotive force of a motor from the current value, the voltage between motor terminals, and the resistance between motor terminals;

presuming a motor angular speed from a back electromotive force constant;

judging a steering-wheel return state or not when the motor angular speed is a finite value; and processing a dead zone having a width proportional to the current value in which the motor angular speed comes to zero in a predetermined range of the back electromotive force under a state other than the steering-wheel return state so that dead zone correction is not applied to the motor angular speed under the steering-wheel return state.

8. A control method according to claim 7, wherein the steering-wheel return state is set to a case in which the direction of the motor angular speed does not coincide with the direction of a steering torque.

9. A control method according to claim 7, wherein said electric power steering system judges whether the difference between an absolute value of the back electromotive force and that of the dead zone is larger than zero to set the motor angular speed to zero when the difference is not larger than zero and set a sign of the back electromotive force and the difference as the motor angular speed when the difference is larger than zero.

10. A controller of an electric power-steering system which controls a motor by supplying a steering assist force to a steering mechanism in accordance with a current control value obtained from a steering assist command value computed in accordance with a steering torque produced in a steering shaft and from the current value of the motor, wherein a motor angular speed is presumed by defining impedance models of motor driving systems different from each other in an intermittent mode and a continuous mode.

11. A controller of an electric power-steering system according to claim 10, wherein a dead zone proportional to the motor current value is set so as to change the gains of the dead zone in the intermittent mode and the continuous mode.

12. A controller of an electric power-steering system according to claim 11, wherein a presumption error due to temperature fluctuation is compensated by measuring a motor temperature.

13. A controller of an electric power-steering system for assist-load-energizing a steering shaft in accordance with the control by a motor in which semiconductor elements are connected to an H-bridge circuit, comprising driving means for driving the semiconductor elements of a first arm out of a set of two semiconductors constituting two arms faced each other in the H-bridge circuit by a PWM signal having a first duty ratio determined in accordance with a current control value and the semiconductor elements of a second arm by a PWM signal having a second duty ratio defined by the function of the first duty ratio, motor current detecting means for detecting a motor current value at a voltage between terminals of a resistor connected with the first and second arms in series, and motor current correcting means for correcting said motor current value at the second duty ratio.

14. A controller of an electric power-steering system according to claim 13, wherein said motor current detecting means is unidirectional-current detection means.

* * * * *